United States Patent [19]
> Rohm

[11] 3,926,446
[45] Dec. 16, 1975

[54] MULTIPLE-JAW POWER CHUCK

[76] Inventor: Günter Horst Röhm, Heinrich-Rohm-Str. 50, 7927 Sontheim, Germany

[22] Filed: June 12, 1974

[21] Appl. No.: 478,683

[30] Foreign Application Priority Data
June 22, 1973 Germany............................ 2331863

[52] U.S. Cl....................... 279/4; 279/121; 92/106; 91/240
[51] Int. Cl.²......................................... B23B 31/30
[58] Field of Search.................. 279/4, 121; 92/106; 91/240

[56] References Cited
UNITED STATES PATENTS

| | | | |
|---|---|---|---|
| 2,854,240 | 9/1958 | Parker et al. | 279/121 |
| 3,576,192 | 4/1971 | Wood | 91/240 |
| 3,771,803 | 11/1973 | Hiestand | 92/106 |

*Primary Examiner*—Donald R. Schran
*Attorney, Agent, or Firm*—Karl F. Ross; Herbert Dubno

[57] ABSTRACT

A chuck has a housing provided with a plurality of jaws displaceable by a double-acting piston in the housing. A nonrotatable distributing ring is received in a circumferential groove on the housing and has axial ends each formed with a circumferential groove in which is provided a seal. Connections are provided for supplying fluid under pressure to each of these grooves underneath the respective seal and each of the seals is formed with a through-going axial hole. Passages extend from the confronting faces of the circumferential grooves carrying the distributing ring to the opposite compartments serving to actuate the jaw-closing piston. An annular groove is formed either in the face of the seal or in the face of each of the end surfaces so that fluid can pass axially from the distributor rings in either axial direction through a one of the annular grooves and a passage to one of the compartments so as to actuate the piston. The pressure behind each of the seals serves to urge it into tight sealing contact with the respective face of the distributor groove.

8 Claims, 1 Drawing Figure

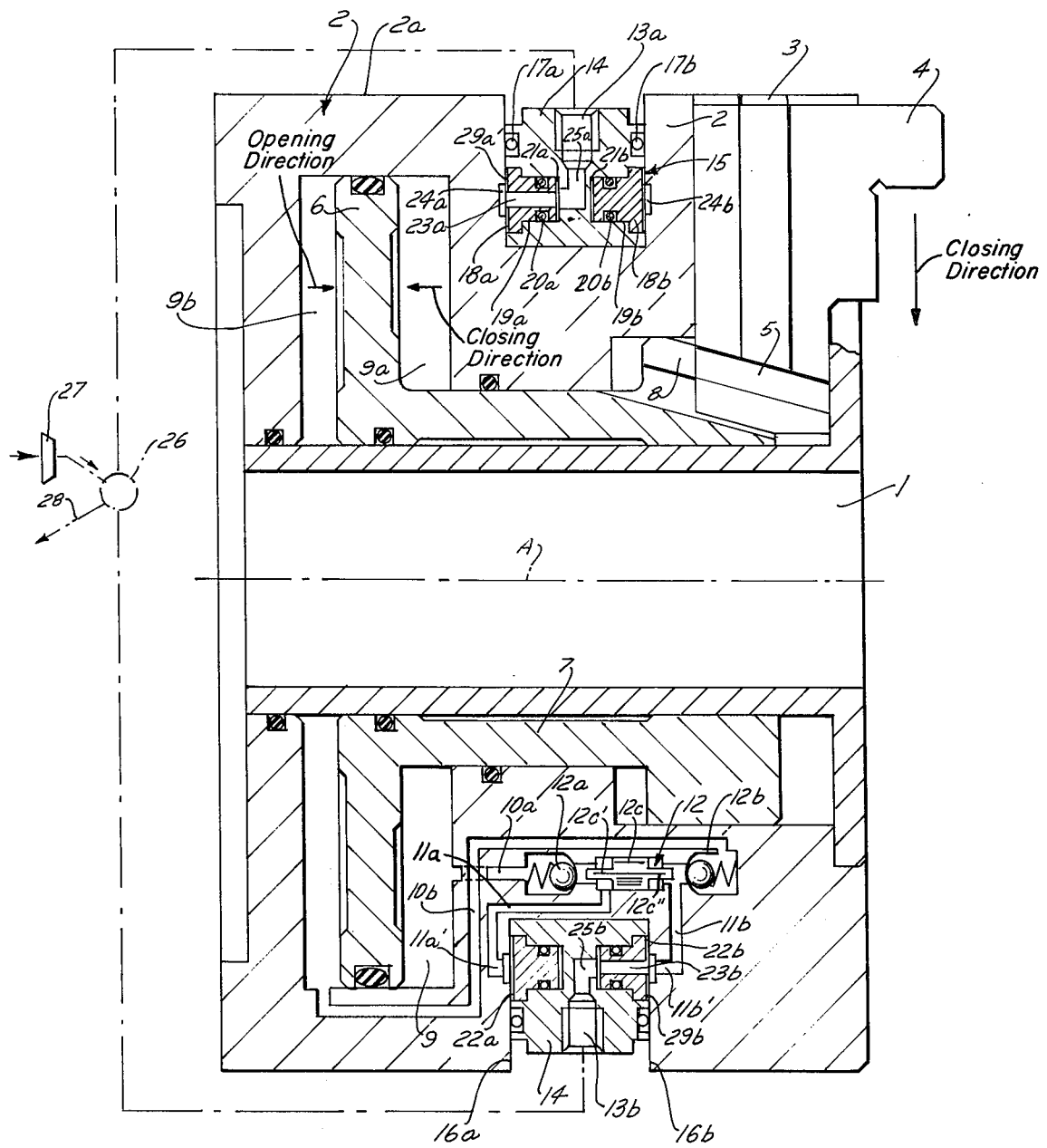

MULTIPLE-JAW POWER CHUCK

FIELD OF THE INVENTION

The present invention relates to a power chuck. More particularly this invention concerns a multiple-jaw chuck as is used on a lathe or the like.

BACKGROUND OF THE INVENTION

A so-called power chuck is known which has a housing adapted to be rotated about an axis and provided with a plurality of angularly spaced jaws. At least fluid-operated double-acting piston is provided in the housing to radially displace the jaws so as to grip a workpiece to be machined. The fluid chamber to either side of the operating piston is connectable to a source of pressurized fluid outside the chuck housing.

In one such system each of the piston operating chambers is connected via a passage or conduit to a respective circumferential groove formed on the chuck housing. These two grooves lie next to each other and are covered by a so-called distributor ring which is rotatable relative to the housing so that it may be held nonrotatable and connected to a valve in the source of pressurized fluid. This distributor ring is formed on its inner periphery with a pair of inwardly open circumferential grooves somewhat larger but nonetheless registering with the grooves on the outside of the chuck housing. A deformable seal formed with a plurality of radial openings is received in each of the large grooves in the distributor ring, and means is provided to prevent the distributor ring from moving axially on the housing. In order to displace the chuck jaws in one radial direction or the other the space behind one of the seals is pressurized by the fluid source so as to press this seal tightly down over the respective groove on the housing, forming a fluidtight connection. The fluid passes through the radial openings from the one groove to the other and thereby pressurizes the respective chamber, displacing the jaw in the desired direction.

It is obviously necessary in some systems to stop the chuck from rotating while the jaws are set, since the seal could not be brought into tight engagement with the chuck housing while this housing is rotating. Thus it is necessary to provide check valves in each passage connecting the respective groove to its piston-operating chamber. Mechanism is provided so that on pressurization of the one chamber back through its check valve the other check valve is opened to allow the fluid in the opposite chamber to escape. It is of extreme importance in such arrangements that the piston seal and the two check valves seal absolutely perfectly and that a very tight clamping be obtained, since the source of fluid pressure must be disconnected from the chuck when it is rotated.

OBJECTS OF THE INVENTION

It is therefore an object of the present invention to provide an improved power chuck.

Another object of this invention is to provide a power chuck whose piston-operating chambers can be left in fluid communication with an external nonrotating fluid source when the chuck is rotated.

SUMMARY OF THE INVENTION

These objects are attained according to the present invention in a power chuck wherein the distributing ring is received in a large circumferential groove formed in the housing, so that this distributing ring can readily rotate relative to the housing. Rolling-contact bearings are provided between the distributor ring and the housing so as to facilitate this relative rotation. This groove has a pair of opposite axial side faces each turned toward the other. A passage extends from each of these side faces to a respective compartment of a respective side of the operating piston.

The distributing ring in accordance with the present invention has a pair of oppositely axially directed annular seal grooves each confronting a respective side face. The ring is formed with a pair of passages each opening at one end at the base of a respective seal groove and at its other end is adapted to be connected to an external source of pressurized fluid. A pair of respective annular seals are received and limited axially displaceable in the seal grooves and each is formed with an axially throughgoing hole. Each of the seals has an face turned toward and paired with a respective side face of the groove for the distributing ring, one of the faces of each pair being formed with an annular groove. In this manner pressurized fluid fed into a seal groove behind the seal forces this seal tightly against the respective side face for fluid flow through the respective axial hole and through the respective passage in the housing into the respective compartment. For such an arrangement, the fluid, be it a liquid or a gas, forms a cushion between the paired faces of the seal and the groove so that friction between these two elements is almost completely eliminated. When compressed air is used as the operating fluid a small amount of leakage insures that the distributing ring virtually floats in this groove on a sort of hydrostatic bearing.

BRIEF DESCRIPTION OF THE DRAWING

The above and other objects, features and advantages will become more readily apparent from the following description, reference being made to the accompanying drawing whose sole FIGURE is an axial section through a multiple-jaw chuck in accordance with the present invention.

SPECIFIC DESCRIPTION

A multiple-jaw chuck has a housing indicated generally at 2 formed with a central throughgoing passage 1 centered on the axis A of rotation of the chuck. A plurality of jaws 4 are radially slidable in slot 3 in the housing. A tube 7 carries at one end slotted inclined-plane (cam) actuators 8 fitting in corresponding grooves 5 on the jaws 4 so that axial displacement of this tube 7 will effect radial displacement of the jaws 4 as is known in the art, as disclosed in U.S. Pat. No. 3,771,803, column 5, lines 17–23 and column 6, lines 54–63.

The end of the tube 7 opposite the actuators 8 is formed with a piston 6 which subdivides a chamber 9 into a pair of compartments 9a and 9b connected via respective passages 10a and 10b to respective check valves 12a and 12b in turn connected via respective passages 11a and 11b terminating at ends 11a' and 11b'.

The housing 2 is formed on its outer surface 2a with a square-section circumferential groove 15 having a pair of opposite axial side faces 16a and 16b each formed with a respective annular groove 24a and 24b. The ends 11a' and 11b' of the conduits 11a and 11b open into the grooves 24a and 24b.

A cylindrically annular steel distributing ring 14 is received in the groove 15 between the faces 16a and 16b thereof. A pair of roller bearings 17a and 17b engaging the surfaces 16a and 16b allow this ring 14 to rotate readily within the groove 15 so that the ring 14 can be fixed to be nonrotatable about the axis A.

The ring 14 is formed with a pair of oppositely open T-shaped grooves 19a and 19b confronting the grooves 24a and 24b. Each of these grooves 19a and 19b receives a respective T-section seal rings 18a, and 18b, made of highly polished steel or of a synthetic-resin such as a polyamide. Each of the seals 18a and 18b is provided with a pair of O-rings 20a and 20b so as to fit them snugly into the respective groove 19a and 19b while permitting limited axial displacement of the seals 18a and 18b in grooves 19a and 19b.

In back of each of the seals 18a and 18b there is formed in the respective grooves 19a and 19b an annular chamber 21a and 21b communicating via respective passages 25a and 25b to respective connections 13a and 13b which are diametrically opposite and which are connectable through a valve 26 to a source of pressurized air 27 or an exhaust outlet 28. Each of the seals rings 18a and 18b is formed with at least one respective axially throughgoing hole 23a and 23b allowing a fluid communication between the respective chambers 21a and 21b and the grooves 24a and 24b. The inner face of each ring 18a and 18b are of smaller area than the outer surfaces thereof and are of larger area than the respective grooves 24a and 24b. The outer faces are provided with polyamide friction coatings 29a and 29b.

Provided between the check valves 12a and 12b is an operating mechanism indicated generally at 12 and comprising a small piston-like body 12c having a pair of end stems 12c' and 12c'' engageable with the balls of the check valves 12a and 12b respectively so as to open these check valves. Pressurization of the passage 11a, for instance, will force the body 12c toward the front of the chuck and thereby open the check valve 12b with its stem 12c'' so as to allow fluid to escape from the chamber 9b.

In operation a workpiece is clamped with the jaws 4 by switching the valve 26 so as to pressurize the chamber 9a in front of the piston 6. This is effected by feeding compressed air to the inlet 13a when it flows through passage 25a to the chamber 21a in back of the seal 18a. The pressure buildup in back of the seal 18a forces its face 22a against the face 16a of the groove 16, while some of the fluid passes through the hole 23a to the feed groove 24a. Slight leakage between the ring 18a and the face 16a causes this ring to float, thereby eliminating most friction between them. Thereupon the fluid passes through passage 11a and through the check valve 12a to the chamber 9a. At the same time the fluid forces the piston body 12c toward the front of the chuck body 2 and opens the valve 12b so that the pressure in chamber 9b can bleed out the exhaust opening 28. Similarly pressurized air fed to the inlet 13b forces the face 22b of the T-section seal 18b against the face 16b and similarly pressurizes the chamber 9b while depressurizing the chamber 9a.

In such a system the friction between the faces 22a and 22b and the confronting faces 16a and 16b is minimal, since most of these surfaces are planed perpendicular to the axis A.

In accordance with the present invention it is also possible to use a fluid such as oil under pressure rather than air, in which case it is advantageous to provide a labyrinth seal or the like adjacent the grooves 24a and 24b. It is also within the scope of this invention to form the grooves 24a and 24b on the faces 22a and 22b of seals 19a and 19b.

I claim:

1. A chuck comprising
   a housing adapted to be rotated about an axis and formed with at least one fluid chamber having two sides, a circumferential groove having a pair of axially spaced confronting side faces, and at least one housing passage having one end opening at one of said sides into said chamber and another end opening at one of said side faces of said groove;
   a plurality of angularly spaced jaws radially displaceable on said housing;
   an axially displaceable piston in said chamber between said sides subdividing said chamber into a pair of compartments;
   cam means between said piston and said jaws for radial displacement of said jaws by axial displacement of said piston,
   a distributing ring rotatably received in said circumferential groove and having a pair of opposite axial ends each confronting a respective side face, at least one of said axial ends being formed with an annular seal groove confronting said one side face, said ring being formed with at least one passage having one end opening at the base of said seal groove and having another end adapted to be connected to an external source of pressurized fluid; and
   at least one annular seal received in and limitedly axially displaceable in said seal groove and formed with at least one axially throughgoing hole, said seal having an end face turned toward and paired with said one side face, one of the faces of said pair being formed with an annular feed groove, whereby pressurized fluid in said seal groove behind said seal forces same toward said one side face for fluid flow through said respective axial hole and through said respective housing passage into the respective compartment.

2. The chuck defined in claim 1 wherein said housing is formed with two such housing passages each having one end opening at a respective side into said chamber and another end opening at a respective side face into said seal groove, said distributing ring being formed with a pair of such annular seal grooves each on a respective axial end and confronting a respective side face and with a pair of such passages each having one end opening at the base of a respective seal groove and another end adapted to be connected to said external source of fluid pressure, said chuck comprising a pair of such annular seals each received in and limitedly axially displaceable in a respective seal groove.

3. The chuck defined in claim 2 wherein each of said seals has a rear face turned toward said distributing ring which has a smaller surface area than its end face.

4. The chuck defined in claim 3 wherein said feed grooves are each formed on a respective side face.

5. The chuck defined in claim 3 wherein at least one of said faces of said pair is provided with a coating having a low coefficient of friction.

6. The chuck defined in claim 3 wherein said seals are of T-section.

7. The chuck defined in claim 3, further comprising a check valve in each of said housing passages normally permitting fluid flow out of the respective compartment, and means for opening the check valve in one housing passage on pressurization of the other housing passage.

8. The chuck defined in claim 3, further comprising a roller bearing between each of said axial ends and the respective side face.

* * * * *